United States Patent [19]
Yamazoe et al.

[11] Patent Number: 6,163,851
[45] Date of Patent: Dec. 19, 2000

[54] DATA PROCESSOR

[75] Inventors: Hirofumi Yamazoe; Shinichi Suzuki, both of Hyogo, Japan

[73] Assignees: Mitsubishi Electric System LSI Design Corporation, Itami; Mitsubishi Denki Kabushiki Kaisha, Tokyo, both of Japan

[21] Appl. No.: 09/048,995

[22] Filed: Mar. 27, 1998

[30]    Foreign Application Priority Data

Nov. 5, 1997  [JP]  Japan .................................... 9-303219

[51] Int. Cl.$^7$ ........................................................ G06F 1/04
[52] U.S. Cl. ........................... 713/600; 713/322; 713/100
[58] Field of Search ................................... 713/1, 2, 100, 713/400, 300, 320, 322–324, 600, 601; 709/220, 221, 222; 364/900; 395/500, 750; 324/142; 710/8, 10, 15, 17–19; 714/22

[56]    References Cited

U.S. PATENT DOCUMENTS

| | | | |
|---|---|---|---|
| 4,463,440 | 7/1984 | Nishura et al. | 364/900 |
| 4,800,333 | 1/1989 | Milkovic | 324/142 |
| 5,430,881 | 7/1995 | Ikeda | 395/750 |
| 5,448,715 | 9/1995 | Lelm et al. | 395/550 |
| 5,475,847 | 12/1995 | Ikeda | 713/300 |
| 5,475,848 | 12/1995 | Ikeda | 395/750 |
| 5,504,908 | 4/1996 | Ikeda | 713/300 |
| 5,550,489 | 8/1996 | Raab | 326/93 |
| 5,625,311 | 4/1997 | Nakatsu | 327/293 |
| 5,638,083 | 6/1997 | Margeson | 345/10 |
| 5,742,650 | 4/1998 | Buckolls et al. | 357/376 |
| 5,822,572 | 10/1998 | Kwaguchi | 713/501 |
| 5,848,281 | 12/1998 | Smalley et al. | 713/323 |
| 5,900,757 | 5/1999 | Aggarwal et al. | 327/189 |
| 5,903,746 | 5/1999 | Swoboda et al. | 713/501 |
| 5,918,058 | 6/1999 | Budd | 713/300 |
| 5,925,132 | 7/1999 | Kadokura et al. | 713/323 |
| 5,931,950 | 8/1999 | Hsu | 713/300 |
| 6,021,500 | 2/2000 | Wang et al. | 713/320 |
| 6,067,631 | 5/2000 | Choi | 713/500 |

FOREIGN PATENT DOCUMENTS 6-83756  3/1994  Japan .

OTHER PUBLICATIONS

"Mitsubishi 8–bit Single–chip Microcomputer 740 Family/ 38000 Series 3851 Group User's Manual", Mitsubishi Electric Corporation, Jul. 1998.

*Primary Examiner*—Thomas C. Lee
*Assistant Examiner*—Ri Jue Mai
*Attorney, Agent, or Firm*—Burns, Doane, Swecker & Mathis, LLP

[57]    ABSTRACT

A data processor including an alternative clock generator for generating, in a power saving mode, an alternative clock signal which is supplied to a peripheral circuit instead of a system clock signal. This enables only the peripheral circuit such as an A/D converter to be put into operation in response to the alternative clock signal in the power saving mode. This solves a problem of a conventional data processor in that it cannot achieve the power saving efficiently because it is unavoidable for the remaining portion of the conventional data processor like a CPU to be involved in a high-rate operation along with the peripheral circuit even if it is desired to operate only the peripheral circuit at a high-rate when releasing the sleep mode or changing the sleep mode to a high-rate mode.

8 Claims, 11 Drawing Sheets

DATA PROCESSOR

BACKGROUND OF THE INVENTION

1. Field of the Invention

The present invention relates to a data processor such as a microcomputer having a peripheral circuit, and a system clock oscillator for generating a system clock signal, and capable of operating in a power saving mode for reducing power consumption.

2. Description of Related Art

Recently, data processors such as microcomputers, above all, single-chip microcomputers have been widely applied to portable equipment like notebook PCs and video cameras, resulting in reduction in their size and power consumption. In particular, there is a growing demand for power saving of equipment using a battery as its power supply to further lengthen its operation time.

In CMOS single-chip microcomputers, their consumed current will be reduced by decreasing the operation frequency because the former is proportional to the latter. However, the operation frequency cannot be reduced if a high-rate operation is required.

As an alternative to the foregoing, the power saving can be achieved by applying sleep mode in which the oscillator of a single-chip microcomputer is stopped while it does not carry out processing. Thus, it operates only when some processing is required.

In the power saving using the sleep mode, however, the single-chip microcomputer cannot operate its embedded peripheral circuits such as an A/D converter while the oscillator is being stopped. To operate the A/D converter and other peripheral circuits, the oscillator must be activated each time before the single-chip microcomputer is brought in operation with them.

Alternatively, the power saving of the single-chip microcomputer is carried out by switching a high-rate mode and low-rate mode. The single-chip microcomputer has the high-rate mode based on a clock signal generated by a high-rate oscillator, and the low-rate mode based on a clock signal generated by a low-rate oscillator, and operates in the low-rate mode to save power except when the high-rate operation is required.

FIG. 11 is a block diagram showing a configuration of a single-chip microcomputer capable of carrying out power saving by switching its mode between the sleep mode, high-rate mode and low-rate mode. In FIG. 11, the reference numeral 100 designates a single-chip microcomputer, 101 designates a CPU, 102 designates a timer, 103 designate a RAM, 104 designates a ROM, 105 designates an interrupt controller, 106 designates an A/D converter, 107 designates an I²C bus, 108 designates an input/output port, 109 designates a clock generator, 110 designates a data bus, 111 designates an address bus, 112 designates a control signal line, 113 designates a high-rate oscillator for generating an original high-rate clock signal, and 114 designates a low-rate oscillator 114 for generating an original low-rate clock signal. These oscillators 113 and 114 generate the original clock signals using an external crystal oscillator or ceramic oscillator with high accuracy.

Next, the operation of the conventional single-chip microcomputer will be described.

The single-chip microcomputer 100, with its timer 102, RAM 103, ROM 104, interrupt controller 105, A/D converter 106, I²C bus 107, input/output port 108 and clock generator 109 connected to the CPU 101 through the data bus 110, address bus 111, and control signal line 112, executes programs stored in the ROM 104 while storing and reading data to and from the RAM 103, thereby carrying out control by activating the peripheral devices such as the timer 102.

In this case, a system clock signal φ generated by the clock generator 109 is required to bring into operation the embedded circuits such as the CPU 101, ROM 104, RAM 103, timer 102, interrupt controller 105, A/D converter 106, I²C bus 107, and input/output port 108. The clock generator 109 generates the system clock signal φ using the original clock signals oscillated by the external oscillators 113 and 114.

The single-chip microcomputer 100 has the CPU 101 execute a sleep mode instruction to bring itself into the sleep mode by stopping the oscillation of the high-rate oscillator 113 and low-rate oscillator 114 and halting the supply of the system clock signal φ to the CPU 101 and the peripheral circuits. To release the sleep mode, an external trigger signal is usually input to recover the supply of the system clock signal φ to the CPU 101 and peripheral circuits. In this case, the high-rate oscillator 113 starts its oscillation in response to the external trigger signal, and restarts the supply of the system clock signal φ after the oscillation has been stabilized.

The switching between the high-rate mode and low-rate mode is generally carried out by the instruction of the CPU 101. For example, when the high-rate operation becomes unnecessary, the following steps are taken to achieve switching from a first state, in which both the high-rate oscillator 113 and low-rate oscillator 114 are oscillating and the system clock signal φ is supplied from the high-rate oscillator 113 to carry out the high-rate operation, to a second state, in which the oscillation of the high-rate oscillator 113 is stopped and the system clock signal φ is supplied from the low-rate oscillator 114 to save power.

(1) The CPU 101 issues a command to have the low-rate oscillator 114 supply the system clock signal φ.

(2) The CPU 101 issues a command to stop the high-rate oscillator 113.

Reversely, switching from the second state to the first state is carried out through the following steps to have the high-rate oscillator 113 supply the system clock signal φ.

(3) The CPU 101 issues a command to restart the oscillation of the high-rate oscillator 113.

(4) The CPU 101 waits until the oscillation of the high-rate oscillator 113 is stabilized.

(5) The CPU 101 issues a command to have the high-rate oscillator 113 supply the system clock signal φ.

The conventional data processor with the foregoing configuration has a problem, in the case of saving power using the sleep mode, in that it must wait for a few hundred microseconds to a few milliseconds until the oscillator has been stabilized after releasing the sleep mode, which causes an idle time.

It has a similar problem, when switching the mode between the high-rate mode and low-rate mode, in that it must wait for a few hundred microseconds to a few milliseconds until the high-rate oscillator has stabilized its oscillation after it started the oscillation, which also involves an idle time. Thus, to operate the A/D converter and other peripheral circuits at the high rate, it is unavoidable that some idle time occurs because they cannot operate at the high-rate while the high-rate oscillator 113 is being stopped, and hence it must be switched to the high-rate mode each time to bring them into operation.

This presents another problem in that effective power saving is difficult. For example, before shifting into the high-rate mode, it is often desirable to operate only the A/D converter or peripheral circuits at the high-rate with keeping the remaining components like the CPU in the sleep mode or in the low-rate mode. To operate the A/D converter or peripheral circuits in the conventional system, however, it is necessary for the CPU to release the sleep mode or to switch into the high-rate mode, which inevitably brings the remaining components into operation at the high-rate. This results in an increase in consumption current due to the remaining components, thereby hindering the effective use of the A/D converter and other peripheral circuits from the viewpoint of power saving.

SUMMARY OF THE INVENTION

The present invention is implemented to solve the foregoing problems. It is therefore an object of the present invention to provide a data processor which can reduce the wait time from the start of the oscillation of the clock signal for operating the peripheral circuits to its stabilization, and can implement the efficient operation of the peripheral circuits in terms of the consumed power, thereby achieving the power saving.

According to one aspect of the present invention, there is provided a data processor that has a normal operation mode in which it operates in a normal rate, and a power saving mode in which it saves consumed power, and that operates in response to a system clock signal generated by a system clock oscillator in the normal operation mode, the data processor comprising: a peripheral circuit; an alternative clock generator for generating an alternative clock signal used instead of the system clock signal; and a clock switching circuit for supplying the peripheral circuit with the alternative clock signal generated by the alternative clock generator in the power saving mode, and with the system clock signal generated by the system clock oscillator in the normal operation mode.

Here, the data processor may further comprise an alternative clock generation controller for controlling generation of the alternative clock signal by the alternative clock generator in the power saving mode.

The peripheral circuit may be an A/D converter.

The power saving mode may be a sleep mode in which generation of the system clock signal is halted, and the alternative clock generation controller may comprise a feedback loop controlling circuit which starts generation of the alternative clock signal by the alternative clock generator in the sleep mode by enabling a feedback loop of the alternative clock generator in response to a trigger signal indicative of a start of a processing of the A/D converter, and which halts the generation of the alternative clock signal by disabling the feedback loop of the alternative clock generator when one of releasing of the sleep mode and completion of A/D conversion by the A/D converter has occurred.

The clock switching circuit may comprise a gate circuit for supplying, in the sleep mode, the A/D converter with the alternative clock generated, under control of the alternative clock generation controller, by the alternative clock generator in response to a clock switching signal based on an operation mode switching signal, and for supplying, when the sleep mode is released, the A/D converter with the system clock by switching from the alternative clock signal in response to the clock switching signal.

The data processor may further comprise: a register for storing in advance a reference value to be compared with an output of the A/D converter; a comparator for comparing the output of the A/D converter with the reference value stored in the register; and a control circuit for releasing the sleep mode of the data processor in response to a compared result by the comparator, and for controlling supply of the system clock to the A/D converter in response to the compared result by the comparator, the supply of the system clock being carried out through the clock switching circuit when the sleep mode is released.

The data processor may have a high-rate mode in which it operates at a high rate and a low-rate mode in which it operates at a low rate, and the power saving mode is the low-rate mode; the alternative clock generation controller may comprise a feedback loop controlling circuit which starts generation of the alternative clock signal by the alternative clock generator in the low-rate mode by enabling a feedback loop of the alternative clock generator in response to a trigger signal indicative of a start of a processing of the A/D converter, and which halts the generation of the alternative clock signal by disabling the feedback loop of the alternative clock generator when one of releasing of the low-rate mode to shift into the high-rate mode and completion of A/D conversion by the A/D converter has occurred; and the clock switching circuit may comprise a gate circuit for supplying, in the low-rate mode, the A/D converter with the alternative clock generated, under control of the alternative clock generation controller, by the alternative clock generator in response to a clock switching signal based on an operation mode switching signal, and for supplying, when the low-rate mode is released to shift into the high-rate mode, the A/D converter with the system clock by switching from the alternative clock signal in response to the clock switching signal. The feedback loop control circuit of the alternative clock generation controller may comprise: a first holding circuit for latching the trigger signal indicative of the start of the processing of the A/D converter, and a completion signal output when the A/D conversion of the A/D converter has been completed; an input circuit for capturing, in response to an output of the first holding circuit latching the trigger signal, a status signal indicative of the power saving mode; a second holding circuit for latching the status signal fed through the input circuit in a phase opposite to a phase captured by the input circuit, and for outputting it as a control signal for controlling clock switching operation of the clock switching circuit; and an oscillation control circuit for controlling enabling and disabling of the feedback loop of the alternative clock generator in response to the status signal captured by the input circuit and to an output of the second holding circuit.

The power saving mode may be a sleep mode in which generation of the system clock signal is halted; the peripheral circuit may be a bidirectional bus system for transferring data through a bidirectional transmission line; the alternative clock generation controller may comprise a detector for having the alternative clock generator start generation of the alternative clock signal in response to a change in a potential level of the bidirectional transmission line, and for having the alternative clock generator halt generation of the alternative clock signal in response to address data the bidirectional bus system receives from the bidirectional transmission line while operating in response to the alternative clock signal; the clock switching circuit may comprise a gate circuit for supplying, in the sleep mode, the bidirectional bus system with the alternative clock signal generated by the alternative clock generator, and for supplying, when the sleep mode is released, the bidirectional bus system with the system clock signal by switching from the alternative clock signal; and the data processor may further comprise an interrupt signal generating circuit for generating an interrupt signal for releasing the sleep mode in response to the address data the bidirectional bus system receives from the bidirectional transmission line while operating in response to the alternative clock signal.

DETAILED DESCRIPTION OF THE PREFERRED EMBODIMENTS

The invention will now be described with reference to the accompanying drawings.

Embodiment 1

Figure 1:
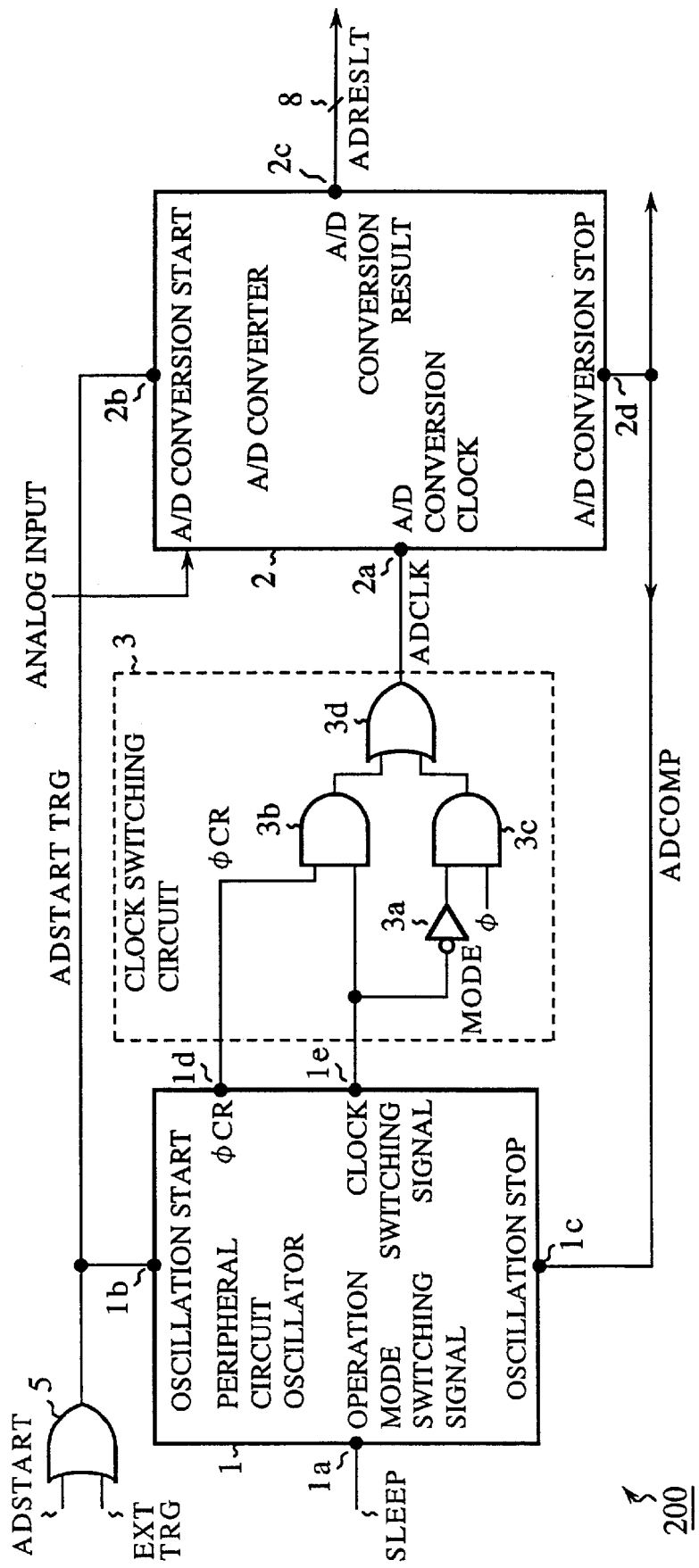
FIG. 1 is a block diagram showing a main part of an embodiment 1 of a data processor in accordance with the present invention.

FIG. 1 is a block diagram showing a main part of an embodiment 1 of a data processor in accordance with the present invention. Although the embodiment 1 handles a single-chip microcomputer as the data processor, the present invention can also be applied to a board microcomputer that comprises on a board a CPU, ROM, RAM and other components, and has a different configuration than the single-chip microcomputer.

In FIG. 1, the reference numeral 200 designate a single-chip microcomputer (data processor), and 1 designate a peripheral circuit oscillator (alternative clock generator). The peripheral circuit oscillator 1 comprises the following terminals: an operation mode switching signal input terminal 1a to which an operation mode switching signal is input indicating the mode of the operation of the single-chip microcomputer 200, that is, the normal operation mode or sleep mode; an oscillation start signal input terminal 1b to which a trigger signal ADSTARTTRG is input for starting the peripheral circuit oscillator 1; an oscillation stop signal input terminal 1c to which an A/D conversion stop signal ADCOMP is input for stopping the oscillation of the peripheral circuit oscillator 1 after the completion of the conversion by an A/D converter as a peripheral circuit; a clock signal $\phi$CR output terminal 1d for producing in the sleep mode an alternative clock signal $\phi$CR generated by the peripheral circuit oscillator 1 for operating the A/D converter; and a clock switching signal output terminal 1e for producing a clock switching signal MODE for selecting a clock signal to be supplied to the A/D converter.

The reference numeral 2 designates the A/D converter embedded in the single-chip microcomputer 200 as a peripheral circuit. It comprises the following terminals: an A/D conversion clock signal input terminal 2a to which an A/D conversion clock signal ADCLK is applied to activate the A/D converter 2; an A/D conversion start signal input terminal 2b to which a trigger signal ADSTARTTRG is applied to start the A/D converter 2; an A/D conversion result output terminal 2c to which an 8-bit bus is connected for outputting an A/D conversion result signal ADRESLT of the A/D converter 2; and an A/D conversion stop signal output terminal 2d from which the A/D conversion stop signal ADCOMP is output after the completion of the A/D conversion by the A/D converter 2.

The reference numeral 3 designates a clock switching circuit (gate circuit) for switching a clock signal to be input to the A/D converter 2 in response to the operation mode, that is, the normal operation mode or sleep mode. The clock switching circuit 3 comprises an inverter 3a for to inverting the clock switching signal MODE output from the clock switching signal output terminal 1e; a two-input AND gate 3b with its input terminals connected to the clock switching signal output terminal 1e and clock signal $\phi$CR output terminal 1d, respectively; a two-input AND gate 3c with its first input terminal connected to an output terminal of the inverter 3a and its second input terminal connected to a system clock signal $\phi$ output by an oscillator not shown in this figure; and a two-input OR gate 3d with its output terminals connected to the output terminals of the two-input AND gate 3b and two-input AND gate 3c, and its output terminal connected to the A/D conversion clock signal input terminal 2a. The foregoing oscillator not shown in this figure is embedded in the single-chip microcomputer 200 which operates in response to the system clock signal $\phi$ output by the oscillator.

The symbol ADSTART designates a trigger signal that a CPU of the single-chip microcomputer 200 (not shown in this figure) generates to start the A/D converter 2, and EXTTRG designates an external trigger signal supplied from the outside of the single-chip microcomputer 200 to start the A/D conversion. These signals are input to a two-input OR gate 5. The symbol SLEEP designates the operation mode switching signal output from the CPU, which is placed at an "H" level in the sleep mode, and "L" level in the normal mode. The trigger signal ADSTARTTRG is output from the two-input OR gate 5 as a logical OR of the trigger signal ADSTART and the external trigger signal EXTTRG, and is supplied to the oscillation start signal input terminal 1b of the peripheral circuit oscillator 1 and A/D conversion start signal input terminal 2b of the A/D converter 2.

Figure 2:
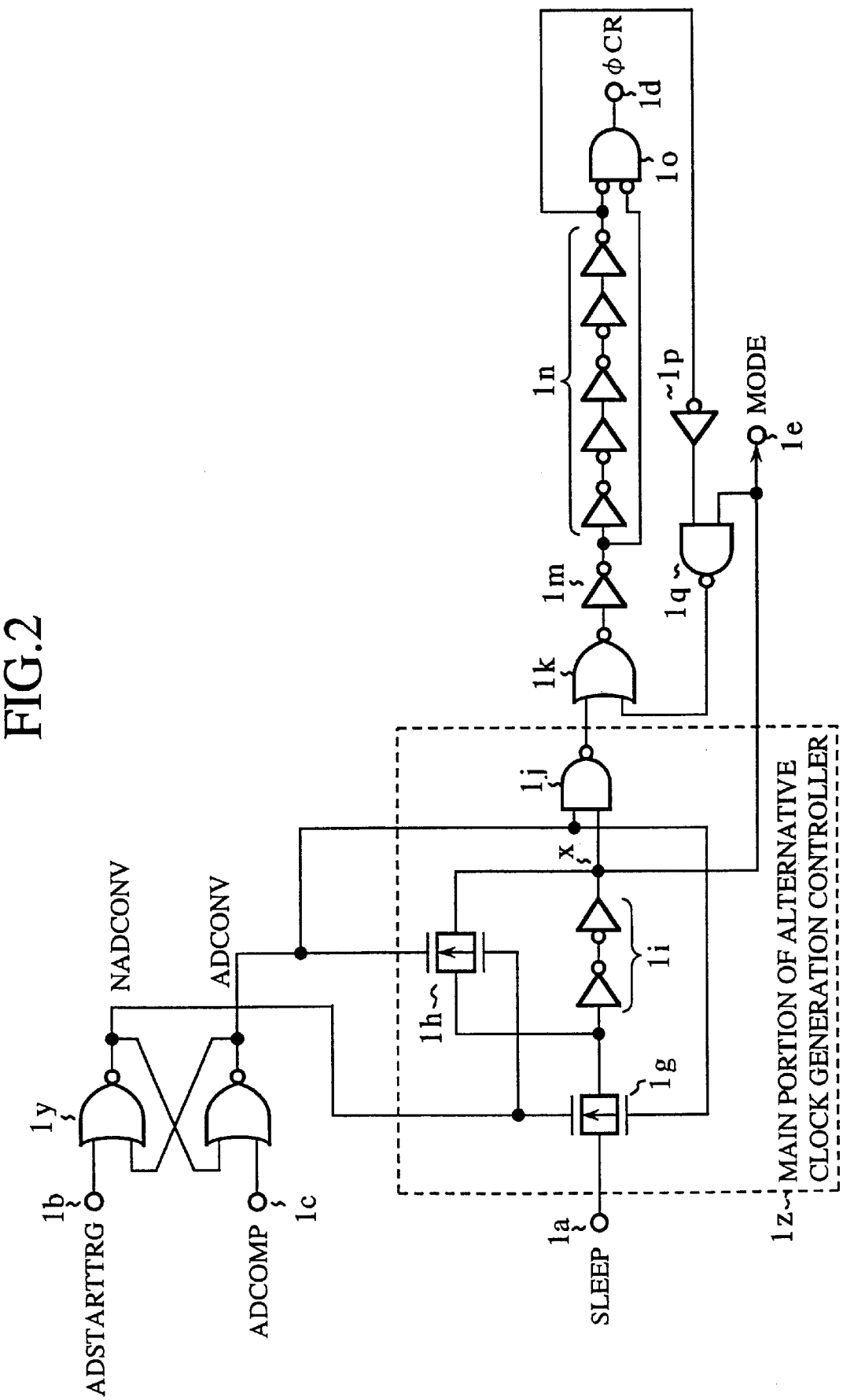
FIG. 2 is a circuit diagram showing a peripheral circuit oscillator and alternative clock generation controller of the embodiment 1.

FIG. 2 is a block diagram showing a configuration of the peripheral circuit oscillator 1 as shown in FIG. 1 and an alternative clock generation controller. In FIG. 2, the reference numeral 1y designates a latch (first holding circuit) that constitutes a part of the alternative clock generation controller, and generates a signal ADCONV from the oscillation start signal ADSTARTTRG and oscillation stop signal ADCOMP. The signal ADCONV is kept at the "H" level while the A/D converter 2 is carrying out the A/D conversion in response to the output of the oscillation start signal ADSTARTTRG, and is placed at the "L" level by the oscillation stop signal ADCOMP when the A/D converter 2 stops the A/D conversion. Here, the oscillation start signal ADSTARTTRG is generated at the same timing as the trigger signal ADSTART or the external trigger signal EXTTRG, and the oscillation stop signal ADCOMP is generated at the same timing as the A/D conversion stop signal ADCOMP.

The reference numerals 1g and 1h each designate a transmission gate with its conducting or nonconducting state is controlled by the signal ADCONV and the inverted signal NADCONV. The transmission gate 1g constitutes a feedback loop control circuit and an input circuit, whereas the transmission gate 1h constitutes a second holding circuit together with a series circuit 1i of two inverters. The series circuit 1i is connected in parallel with the transmission gate 1h. The reference numeral 1j designates a two-input NAND gate with its first input terminal connected to the signal ADCONV and its second input terminal connected to a connecting point X of the outputs of the transmission gate 1h and serial circuit 1i. The two-input NAND gate 1j constitutes an oscillation control circuit and the feedback loop control circuit. The reference numeral 1k designates a two-input NOR gate with its first input terminal connected to the output of the two-input NAND gate 1j and its second input terminal connected to the output of a two-input NAND gate 1q. The reference numeral 1m designate an inverter, and 1n designates a delay circuit consisting of six inverters. The reference numeral 1o designates a two-input NOR gate with its first input terminal connected to the output of the final inverter of the delay circuit in and with its second input terminal connected to the output terminal of the inverter 1m. The reference numeral 1p designates an inverter for inverting the output of the final inverter of the delay circuit 1n and for feeding its output back to the input side, and 1q designates a two-input NAND gate with its first input terminal connected to the output terminal of the inverter 1p and the second input terminal connected to the connecting point X of the outputs of the transmission gate 1h and serial circuit 1i connected in parallel. The reference numeral 1z designates a main portion of the alternative clock generation controller constituting it along with the latch 1y.

The clock switching signal MODE output from the clock switching signal output terminal 1e is acquired from the connecting point X of the outputs of the transmission gate 1h and serial circuit 1i connected in parallel.

Next, the operation of the present embodiment 1 will be described.

Figure 3:
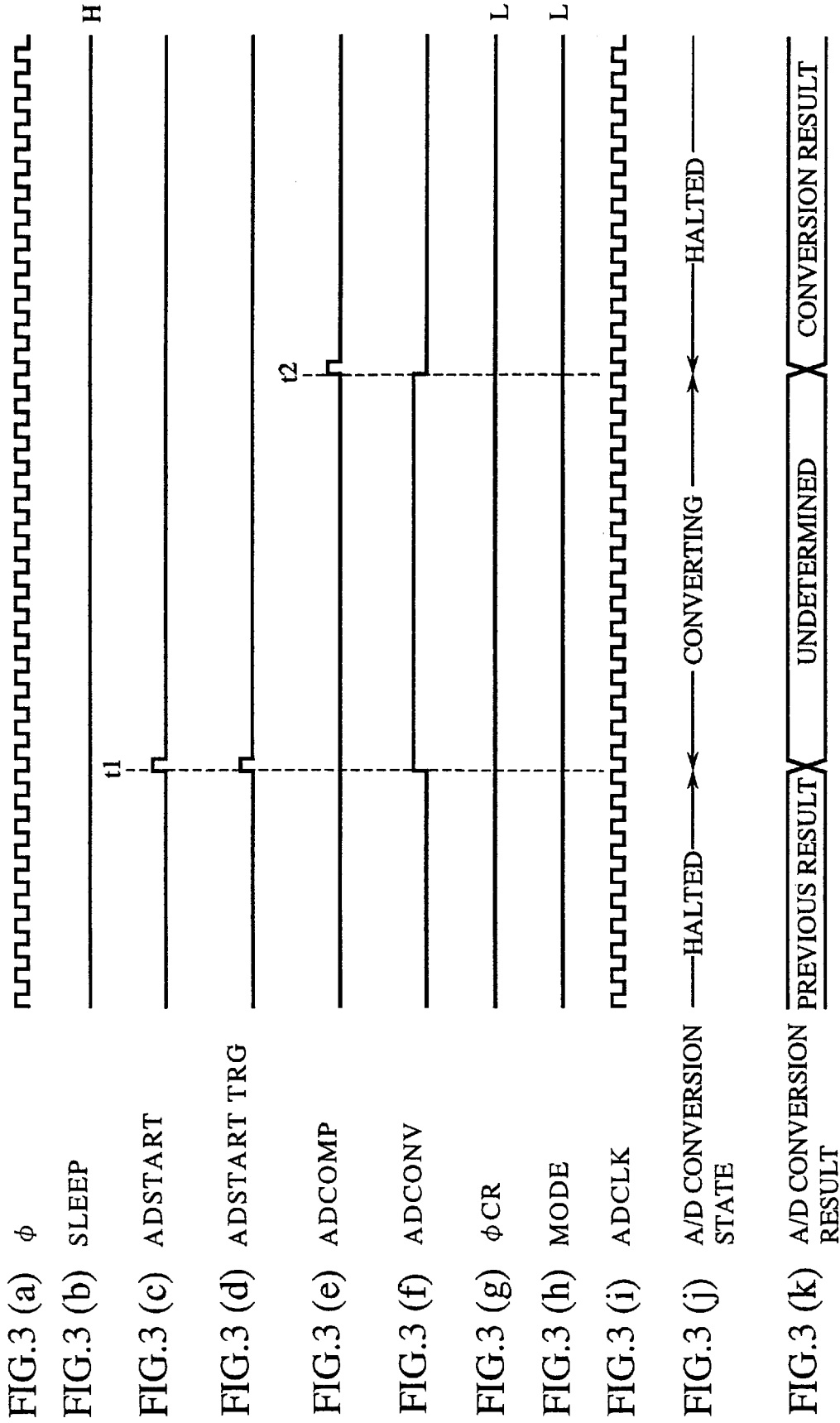
FIGS. 3(a)–(k) are timing charts for illustrating signal waveforms of various portions in the embodiment 1 when carrying out the A/D conversion in a normal mode.
Figure 4:
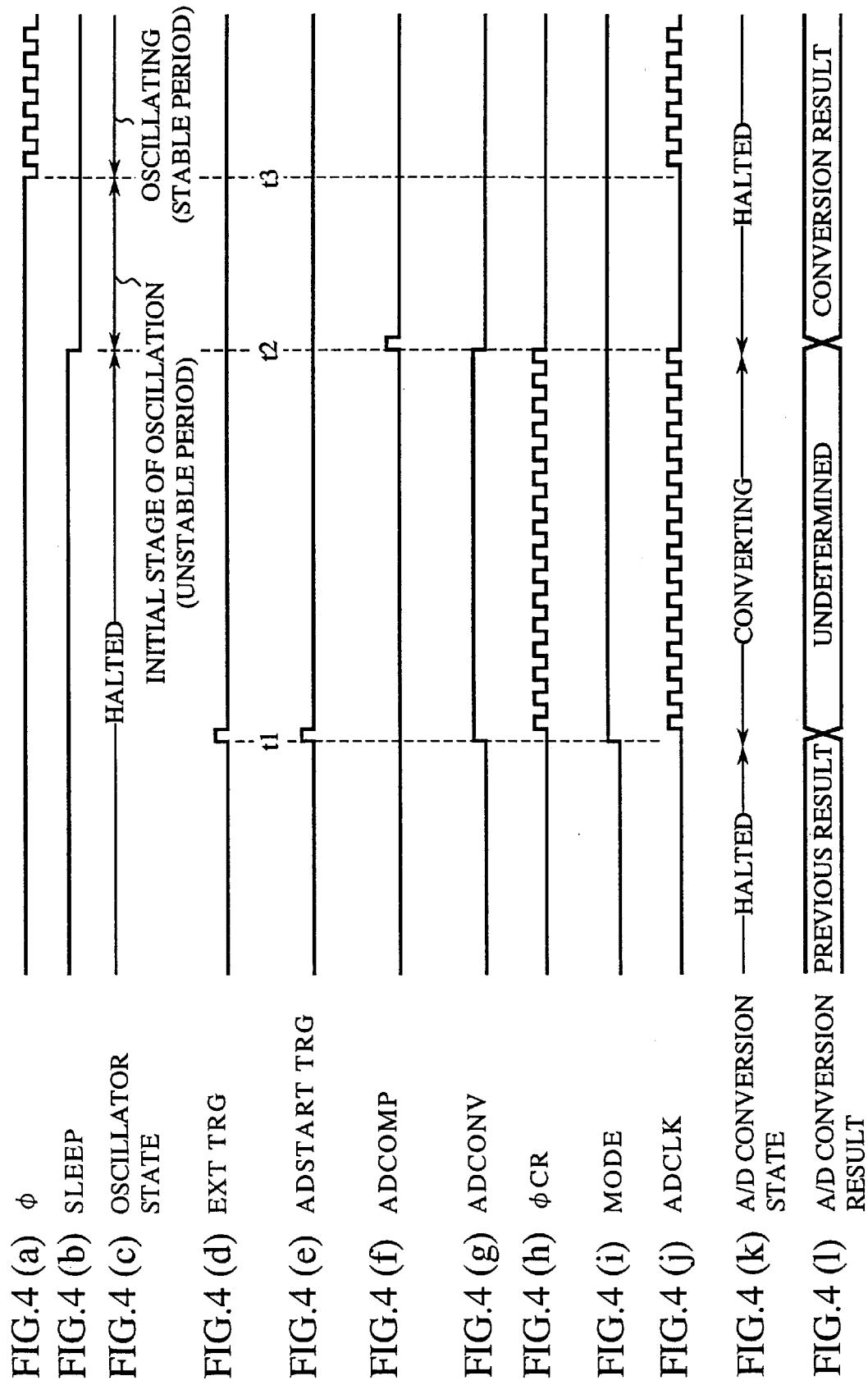
FIGS. 4(a)–(l) are timing charts for illustrating signal waveforms of various portions in the embodiment 1 when carrying out the A/D conversion in a sleep mode.

FIGS. 3(a)–(k) are timing charts showing signal waveforms of various portions in the present embodiment 1 when the A/D conversion is carried out in the normal mode, and FIG. 4 is a corresponding timing chart when it is carried out in the sleep mode.

(1) The A/D conversion in the normal mode.

First, the A/D conversion in the normal mode will be described with reference to FIG. 3. It is the same as the conventional A/D conversion carried out in response to the system clock signal φ.

When the CPU of the single-chip microcomputer 200 outputs the trigger signal ADSTART at time t1 as illustrated in FIG. 3(c) as a command to start the A/D conversion, the trigger signal ADSTARTTRG is output at the same time t1 in response to the trigger signal ADSTART, and is delivered to the oscillation start signal input terminal 1b of the peripheral circuit oscillator 1 and the A/D conversion start signal input terminal 2b of the A/D converter 2.

As a result, the oscillation start signal ADSTARTTRG is supplied to the latch 1y as shown in FIG. 2 at time t1, which causes the signal ADCONV to be placed at the "H" level. Thus, the transmission gate 1g is brought into the conducting state by the signal ADCONV at the "H" level and the inverted signal NADCONV at the "L" level, and captures the operation mode switching signal SLEEP. In this case, the transmission gate 1h is kept at the nonconducting state.

Since the operation mode switching signal SLEEP is placed at the "L" level in the normal mode, the connecting point X of the outputs of the transmission gate 1h and serial circuit 1i is also placed at the "L" level. Thus, the output of the two-input NAND gate 1j and that of the two-input NAND gate 1q are both set at the "H" level, and the output of the two-input NOR gate 1k is placed at the "L" level. Accordingly, the peripheral circuit oscillator 1 does not start its oscillation, and the alternative clock signal φCR output from the clock signal φCR output terminal 1d is kept at the "L" level as illustrated in FIG. 3(g).

In addition, the clock switching signal MODE output from the clock switching signal output terminal 1e is also kept at the "L" level as illustrated in FIG. 3(h).

As a result, the two-input AND gate 3b closes and the two-input AND gate 3c opens, so that the system clock signal φ are is supplied to the A/D conversion clock signal input terminal 2a of the A/D converter 2 through the two-input OR gate 3d.

Thus, at time t1, the A/D converter 2 starts the A/D conversion in response to the trigger signal ADSTARTTRG and system clock signal φ fed thereto, and completes it with generating the A/D conversion stop signal ADCOMP at time t2 after a predetermined clock cycles (16 cycles in this case) as illustrated in FIGS. 3(f) and 3(j).

The A/D conversion stop signal ADCOMP inverts the latch 1y as shown in FIG. 2, thereby placing the signal ADCONV at the "L" level and the inverted signal NADCONV at the "H" level. This brings the transmission gate 1g into the nonconducting state and the transmission gate 1h into the conducting state. The transmission gate 1h thus brought into the conducting state constitutes a latch circuit together with the serial circuit 1i, and latches the operation mode switching signal SLEEP of the "L" level. In this case, it is also possible to cause an interrupt to the CPU using the A/D conversion stop signal ADCOMP. Thus, the A/D conversion result signal ADRESLT is output at time t2.

(2) The A/D Conversion in the Sleep Mode.

Next, the A/D conversion in the sleep mode will be described which is started by the external trigger signal EXTTRG fed from the outside of the single-chip microcomputer 200 and is carried out as shown in FIG. 4.

In the sleep mode, the system clock signal φ is set at the "H" level as illustrated in FIG. 4(a) because the system clock oscillator embedded in the single-chip microcomputer 200, which is not shown in FIG. 1, suspends its oscillation. In addition, the operation mode switching signal SLEEP is set at the "H" level because of the sleep mode, and is input to the operation mode switching signal input terminal 1a.

When the external trigger signal EXTTRG is input at time t1 to start the A/D conversion as illustrated in FIG. 4(d), the trigger signal ADSTARTTRG is output at the same time t1 as illustrated in FIG. 4(e), and is supplied to the latch 1y shown in FIG. 2 as the oscillation start signal, which places the signal ADCONV at the "H" level and the inverted signal NADCONV at the "L" level. Thus, the transmission gate 1g is brought into conducting state, and the operation mode switching signal SLEEP of the "H" level is captured through the operation mode switching signal input terminal 1a.

As a result, the clock switching signal MODE output from the clock switching signal output terminal 1e is also placed at the "H" level. Hence, the two-input AND gate 3b opens, and the two-input AND gate 3c closes, which makes a preparation for supplying the A/D conversion clock signal input terminal 2a of the A/D converter 2 with the alternative clock signal φCR through the two-input OR gate 3d, when it is output from the clock signal φCR output terminal 1d.

Incidentally, unless the trigger signal ADSTARTTRG is output, the signal ADCONV and the inverted signal NADCONV are kept at the "L" and "H" levels, respectively. Accordingly, the transmission gate 1g is kept at the non-conducting state and the transmission gate 1h is placed at the conducting state. In this case, since the operation mode switching signal SLEEP of the "L" level has been latched by the latch circuit consisting of the transmission gate 1h and serial circuit 1i, no oscillation of the peripheral circuit oscillator 1 takes place, keeping the alternative clock signal φCR at the "L" level, and the A/D convertor clock signal ADCLK in halted state.

Once the "H" level operation mode switching signal SLEEP has been captured at time t1, the connecting point X of the outputs of the transmission gate 1h and two-input NAND gate 1j connected in parallel is brought into the "H" level. This places the output of the two-input NAND gate 1j at the "L" level, enabling the output of the two-input NAND gate 1q. As a result, the output of the two-input NOR gate 1k changes in response to the output of the two-input NAND gate 1q, and the peripheral circuit oscillator 1 starts its oscillation, outputting the alternative clock signal φCR from the clock signal φCR output terminal 1d as illustrated in FIG. 4(h). The alternative clock signal φCR is supplied to the A/D conversion clock signal input terminal 2a of the A/D converter 2 through the two-input AND gate 3b and two-input OR gate 3d whose gates are open.

It should be noted here that the oscillation of the peripheral circuit oscillator 1 is stabilized in a short time because of its light load.

The trigger signal ADSTARTTRG, which is produced at the same time t1 with the external trigger signal EXTTRG for starting the A/D conversion as illustrated in FIGS. 4(d) and 4(e), is also supplied to the A/D conversion start signal input terminal 2b of the A/D converter 2. Thus, the A/D converter 2, receiving the trigger signal ADSTARTTRG and the alternative clock signal φCR, starts the A/D conversion, and completes it with generating the A/D conversion stop signal ADCOMP after the predetermined clock cycles (16 clock cycles, in this case) have elapsed at time t2. Completing the A/D conversion, the A/D converter 2 produces the A/D conversion result signal ADRESLT consisting of an 8-bit converted value.

At the same time t2, the A/D conversion stop signal ADCOMP requires the CPU to release the sleep mode, and activates the system clock oscillator not shown in the drawings. Thus, the CPU releases the sleep mode at time t2, and sets the operation mode switching signal SLEEP at the "L" level as illustrated in FIG. 4(b). Although the system clock oscillator starts its oscillation at time t2, at which the sleep mode is released, the system clock signal φ is not supplied to the CPU and A/D converter 2 until it is stabilized at time t3 as illustrated in FIGS. 4(a) and 4(c). In other words, the system clock oscillator requires the oscillation stabilized interval from t2 to t3, and the system clock signal φ is supplied to the CPU and the A/D converter 2 at time t3 at which that interval has passed.

In the peripheral circuit oscillator 1 which receives the A/D conversion stop signal ADCOMP at the oscillation stop signal input terminal 1c at time t2, the latch 1y is flipped in response to it, changing the signal ADCONV from the "H" to "L" level at time t2 as illustrated in FIG. 4(g). Thus, the output of the two-input NAND gate 1j is placed at the "H" level, and the output of the two-input NOR gate 1k is placed at the "L" level, resulting in the completion of the A/D conversion and the halt of the oscillation of the alternative clock signal φCR.

It is possible to cause an interrupt to the CPU by the A/D conversion stop signal ADCOMP.

Thus, it is possible for the A/D converter 2 to carry out the A/D conversion in response to the externally supplied external trigger signal EXTTRG even in the sleep mode, and for the single-chip microcomputer 200 to start its operation from the sleep mode after the A/D conversion has been completed.

As described above, the present embodiment 1 can activate the peripheral circuit oscillator 1 in response to the externally supplied external trigger signal EXTTRG in the sleep mode, and have only the A/D converter 2, the peripheral circuit, operate in response to the peripheral alternative clock signal φCR generated by the peripheral circuit oscillator 1 at the rate corresponding to the clock signal, thereby enabling the A/D converter to operate during the sleep mode without generating the system clock signal φ. This offers an advantage that only the peripheral circuit is activated with preventing the remaining portion from being put into operation, thus achieving efficient power saving.

Embodiment 2

Figure 5:
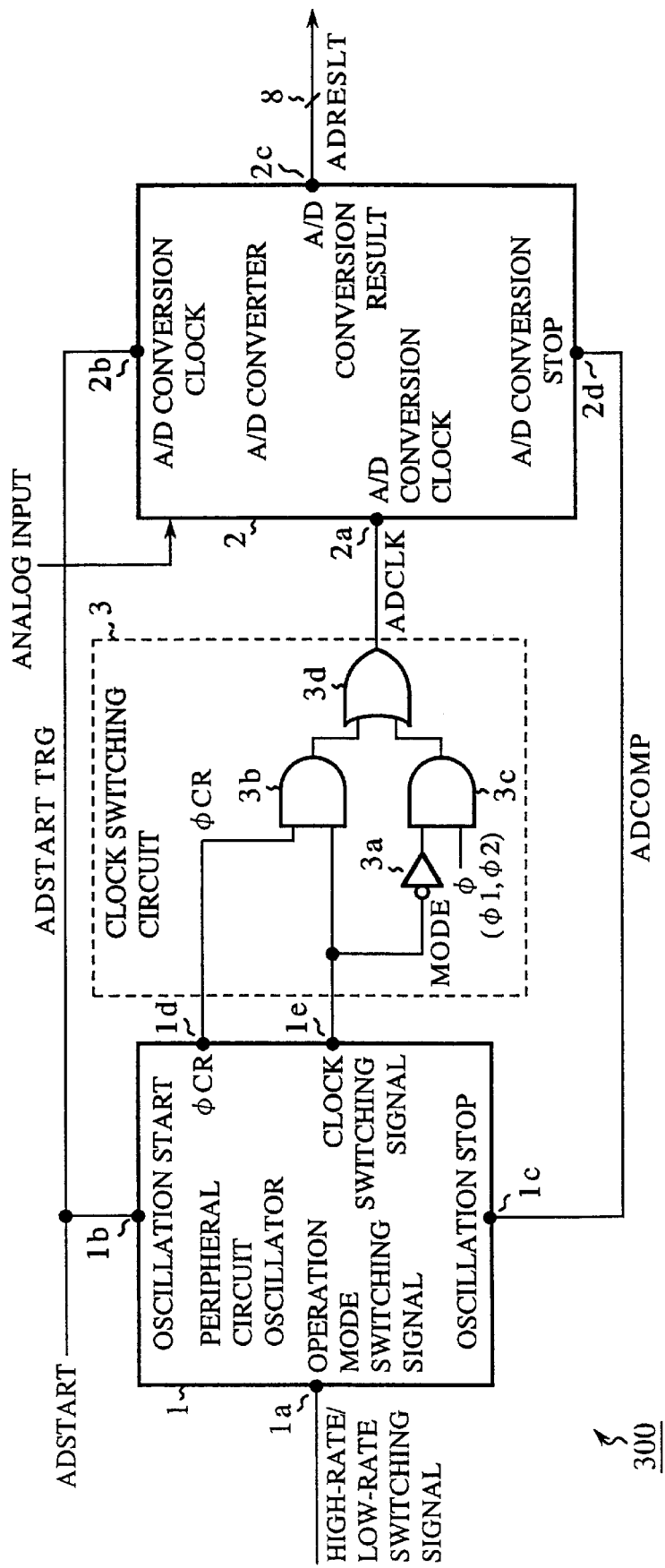
FIG. 5 is a block diagram showing a main part of an embodiment 2 of the data processor in accordance with the present invention.

FIG. 5 is a block diagram showing a main portion of an embodiment 2 of the data processor in accordance with the present invention, in which the same or corresponding portions to those of FIG. 1 are designated by the same reference numerals and the description thereof is omitted here. The circuit configuration as shown in FIG. 2 is also applied to the present embodiment 2.

Although the embodiment 2 handles a single-chip microcomputer as the data processor, the present invention can also be applied to a board microcomputer that comprises on a board a CPU, ROM, RAM and other components, and has a different configuration than the single-chip microcomputer.

In FIG. 5, the reference numeral 300 designate a single-chip microcomputer (data processor) of the present embodiment 2. The single-chip microcomputer 300 comprises a high-rate oscillator and low-rate oscillator for generating a pair of system clock signals φ1 and φ2, and the operation mode switching signal input terminal 1a of the peripheral circuit oscillator 1 is supplied with the high-rate/low-rate operation mode switching signal for ID switching between a high-rate mode based on the high-rate system clock signal φ1 generated by the high-rate oscillator and the low-rate mode based on the low-rate system clock signal φ2 generated by the low-rate oscillator. The high-rate/low-rate operation mode switching signal is set at the "H" level in the low-rate mode and at the "L" level in the high-rate mode.

Next, the operation of the present embodiment 2 in the low-rate mode will be described with reference to the timing chart of FIGS. 6(a)–(m) which illustrate signal waveforms of various portions while the A/D conversion is carried out in the low-rate mode.

Since the single-chip microcomputer 300 operates in the low-rate mode, the system clock signal φ is based on the low-rate system clock signal φ2 oscillated by the low-rate oscillator as illustrated in FIG. 6(a). Besides, the high-rate/low-rate operation mode switching signal of the "H" level is supplied to the operation mode switching signal input terminal 1a, and hence the clock switching signal MODE of the "H" level is output from the clock switching signal output terminal 1e. Thus, the alternative clock signal φCR is selected as the A/D conversion clock signal ADCLK to be supplied to the A/D conversion clock signal input terminal 2a.

In this case, since the trigger signal ADSTARTTRG is not produced from the two-input OR gate 5, the alternative clock signal φCR is set at the "L" level, and hence the A/D conversion clock signal ADCLK supplied to the A/D conversion clock signal input terminal 2a is also set at the "L" level.

Figure 6:
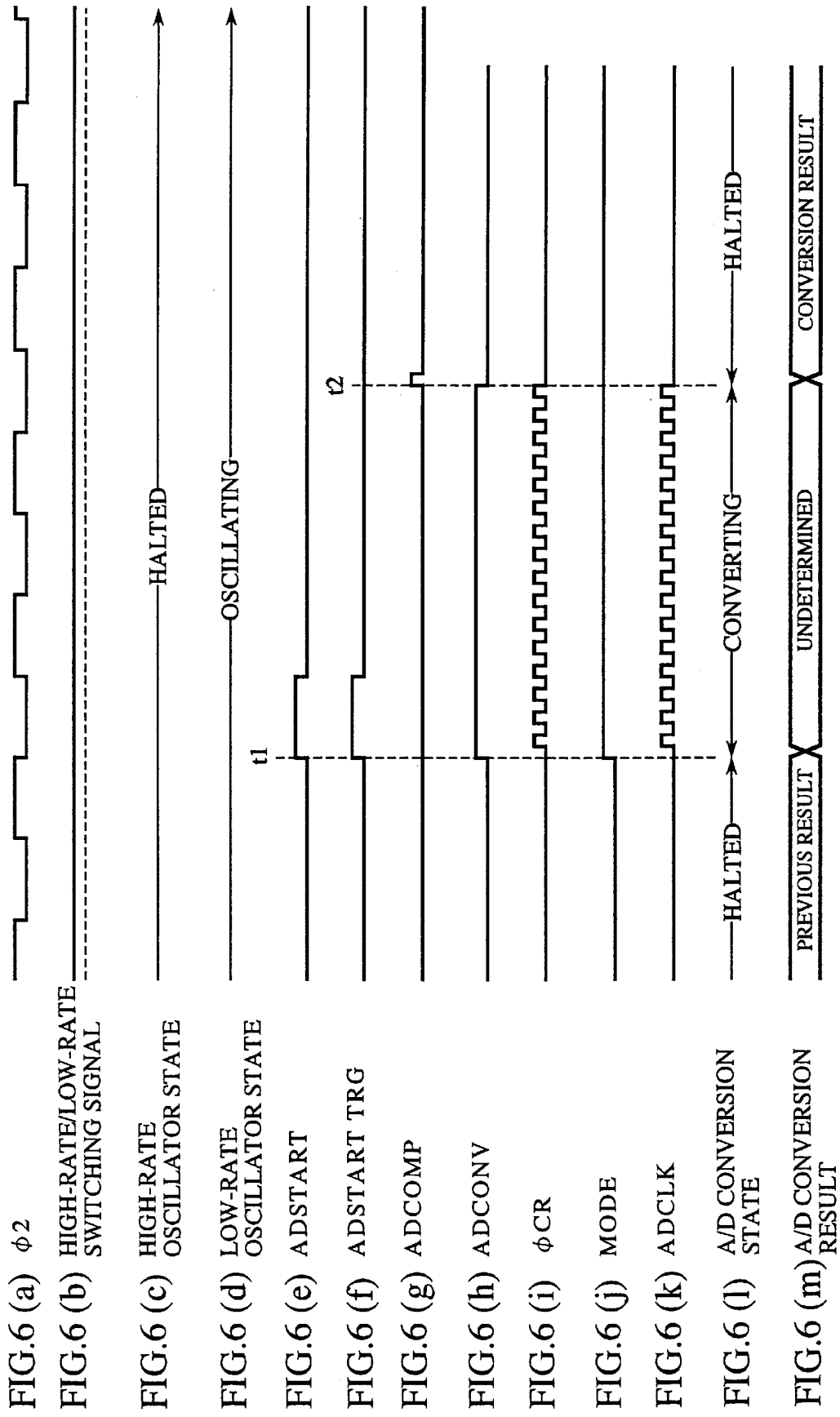
FIGS. 6(a)–(m) are timing charts for illustrating signal waveforms of various portions in the embodiment 2 when carrying out the A/D conversion in a low-rate mode.

At time t1 of FIG. 6, the CPU of the single-chip microcomputer 300, which is not shown in FIG. 5, outputs the trigger signal ADSTART as illustrated in FIG. 6(e) as a command to start the A/D conversion. The trigger signal ADSTARTTRG is output at the same time t1 in response to the trigger signal ADSTART, and is delivered to the oscillation start signal input terminal 1b of the peripheral circuit oscillator 1 and the A/D conversion start signal input terminal 2b of the A/D converter 2.

As a result, the trigger signal ADSTARTTRG is supplied to the latch 1y as shown in FIG. 2 at time t1, which causes the signal ADCONV and the inverted signal NADCONV to be placed at the "H" level and "L" level, respectively. Thus, the transmission gate 1g is brought into the conducting state by the signal ADCONV at the "H" level and the inverted signal NADCONV at the "L" level, and captures the high-rate/low-rate operation mode switching signal through the operation mode switching signal input terminal 1a. In this case, the transmission gate 1h is kept at the nonconducting state.

At the same time t1, the clock switching signal MODE output from the clock switching signal output terminal 1e is placed at the "H" level as illustrated in FIG. 3(j). As a result, the two-input AND gate 3b opens and the two-input AND gate 3c closes, which enable the alternative clock signal φCR to be supplied to the A/D conversion clock signal input terminal 2a of the A/D converter 2 through the two-input OR gate 3d, if it is output from the clock signal φCR output terminal 1d.

When the high-rate/low-rate operation mode switching signal of the "H" level has been captured through the operation mode switching signal input terminal 1a at time t1, the connecting point X of the outputs of the transmission gate 1h and serial circuit 1i is also placed at the "H" level. This in turn places the output of the two-input NAND gate 1j at the "L" level, enabling the output of the two-input NAND gate 1q. Thus, the output of the two-input NOR gate 1k changes in response to the output from the two-input NAND gate 1q, and hence the peripheral circuit oscillator 1 starts its oscillation at time t1 as illustrated in FIG. 6(i). As a result, the alternative clock signal φCR is output from the clock signal φCR output terminal 1d, and is supplied to the A/D conversion clock signal input terminal 2a of the A/D converter 2 through the two-input AND gate 3b and two-input OR gate 3d whose gates are open.

The trigger signal ADSTARTTRG, which is produced at the same time t1 with the trigger signal ADSTART for starting the A/D conversion as illustrated in FIGS. 6(e) and 6(f), is also supplied to the A/D conversion start signal input terminal 2b of the A/D converter 2. Thus, the A/D converter 2, receiving the trigger signal ADSTARTTRG and the alternative clock signal φCR as illustrated in FIG. 6(i), starts the A/D conversion at time t1, and completes it with generating the A/D conversion stop signal ADCOMP after the predetermined clock cycles (16 clock cycles, in this case) have elapsed at time t2. Completing the A/D conversion, the A/D converter 2 produces the A/D conversion result signal ADRESLT consisting of an 8-bit converted value.

In the peripheral circuit oscillator 1, the A/D conversion stop signal ADCOMP is input to the oscillation stop signal input terminal 1c, resulting in the completion of the A/D conversion and the halt of the oscillation of the alternative clock signal φCR.

Thus, it is possible for the A/D converter 2 to carry out the A/D conversion at a high-rate in response to the frequency of the alternative clock signal φCR even when the single-chip microcomputer 200 is operating in the low-rate mode.

Here, the A/D conversion stop signal ADCOMP can cause an interrupt to the CPU. It is also possible to add circuitry for automatically carrying out a series of operations such as activating the high-rate oscillator to start its oscillation by the A/D conversion stop signal ADCOMP, and switching the operation mode of the single-chip microcomputer 300 to the high-rate mode after the oscillation has been stabilized.

As described above, the present embodiment 2 can activate the peripheral circuit oscillator 1 in response to the trigger signal ADSTART supplied from the CPU operating in the low-rate mode, and have only the A/D converter 2, the peripheral circuit, operate in response to the peripheral alternative clock signal φCR generated by the peripheral circuit oscillator 1 at the rate corresponding to the clock signal, thereby enabling the A/D converter to operate even in the low-rate mode without releasing the low-rate mode and without shifting into the high-rate mode to generate the high-rate system clock signal φ1 as in the conventional system. This offers an advantage of operating only the peripheral circuit at the high-rate in the low-rate mode, thereby achieving the efficient power saving.

Embodiment 3

Next, an example will be described which carries out A/D conversion in response to an external trigger signal in the sleep mode in a single-chip microcomputer embedding an A/D converter, and starts the microcomputer from the sleep mode only if the A/D conversion result compared with a reference value prestored in a register satisfies a certain condition.

Figure 7:
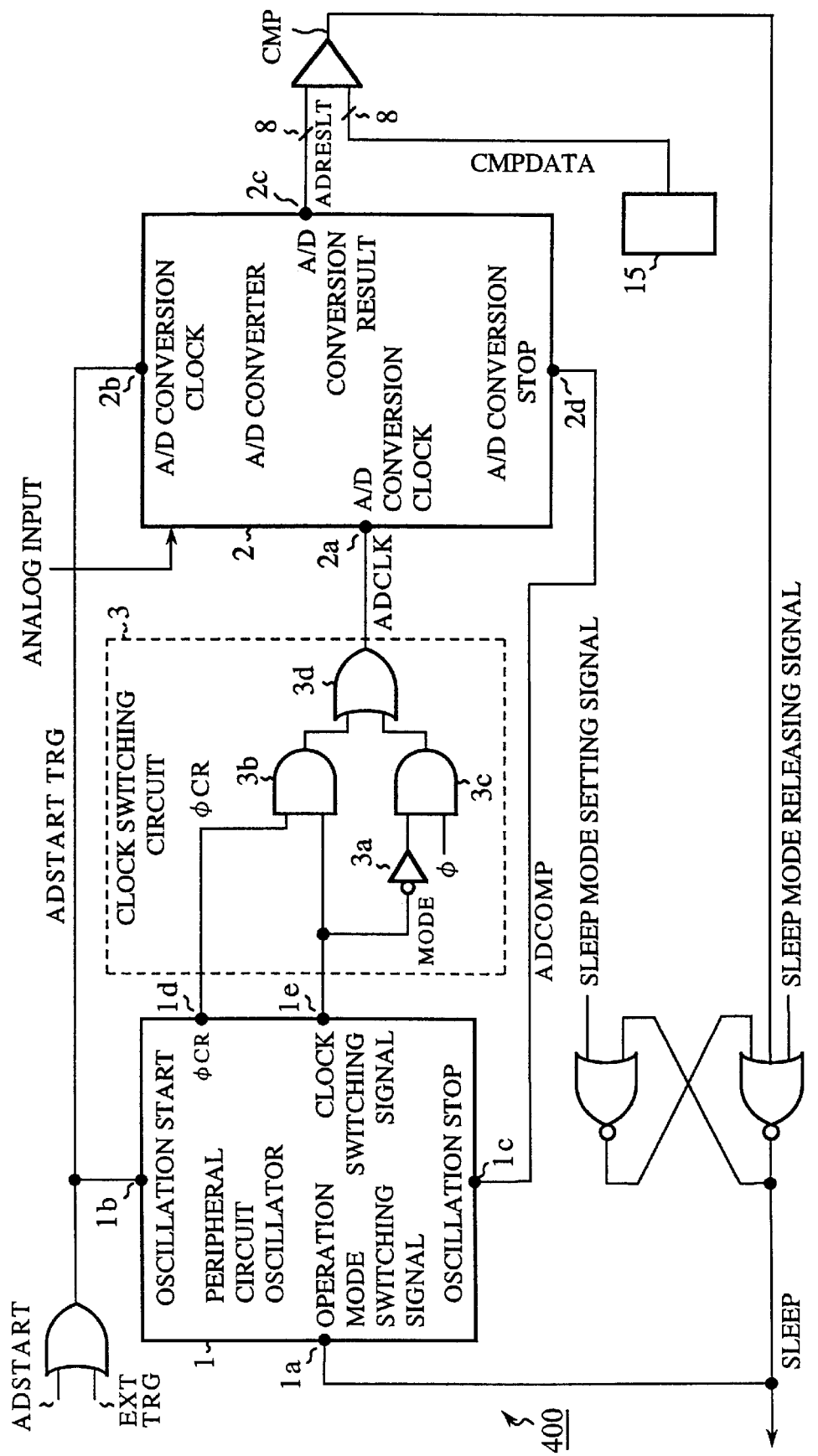
FIG. 7 is a block diagram showing a main part of an embodiment 3 of the data processor in accordance with the present invention.

FIG. 7 is a block diagram showing a main part of an embodiment 3 of the data processor in accordance with the present invention, in which the same or corresponding portions to those of FIG. 1 are designated by the same reference numerals, and the description thereof is omitted here. The circuit configuration as shown in FIG. 2 is also applied to the present embodiment 3.

In FIG. 7, the reference numeral 400 designates a single-chip microcomputer (data processor) of the present embodiment 3; and 15 designate a comparison register (register) for storing a reference value in advance; 16 designates a comparator for comparing the conversion result signal ADRESLT output from the A/D converter 2 with the reference value stored in the comparison register 15. The reference symbols CMPDATA and CMP designate the reference value stored in the comparison register 15, and a compared result signal obtained by comparing the A/D conversion result signal ADRESLT with the reference value CMPDATA, respectively. The reference numeral 19 designates a latch (control circuit) for outputting the operation mode switching signal SLEEP of the "H" level in response to a sleep mode setting signal fed from the CPU, and for outputting that of the "L" level in response to a sleep mode releasing signal.

Next, the operation of the embodiment 3 will be described.

Figure 8:
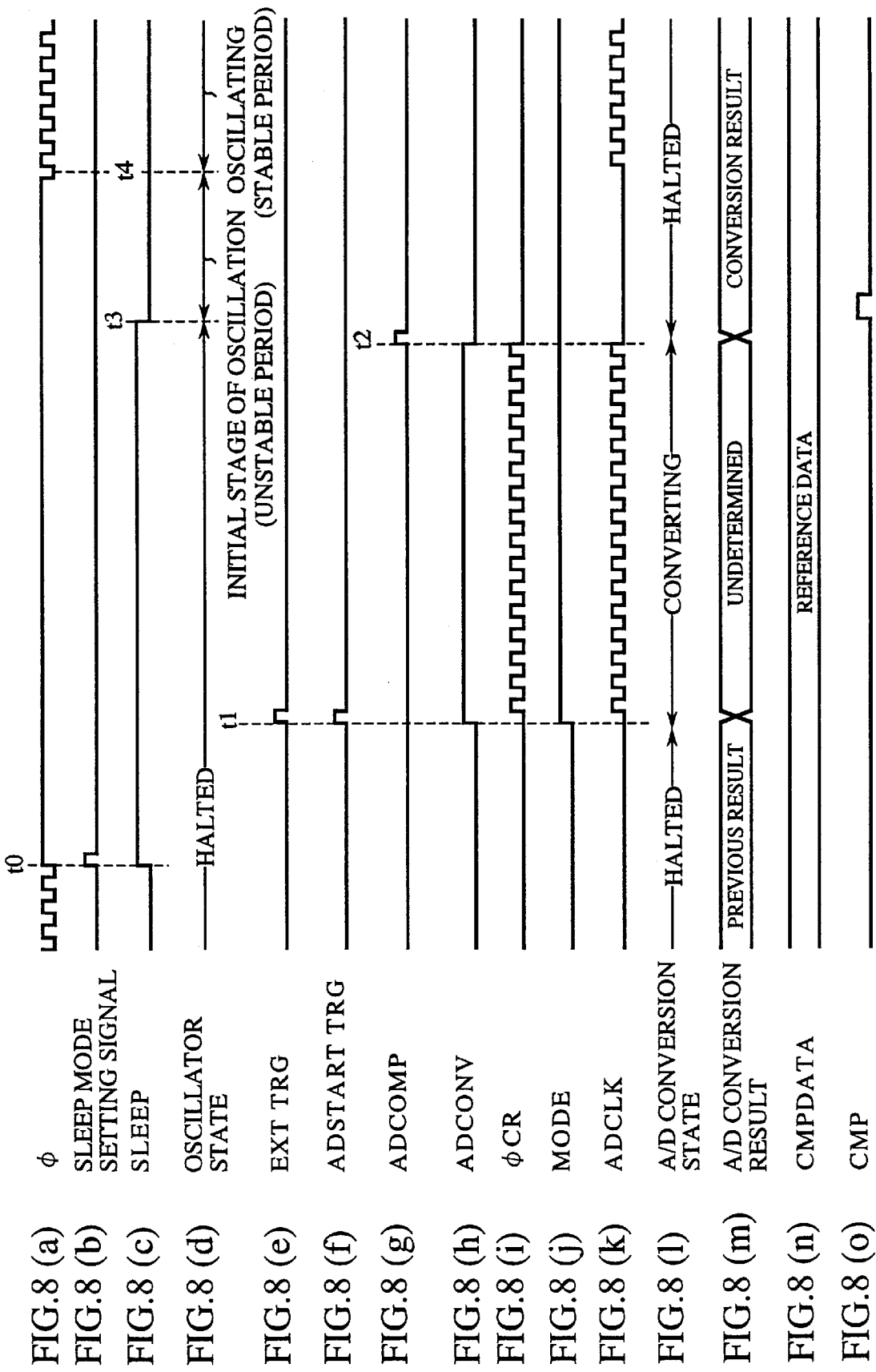
FIGS. 8(a)–(o) are timing charts for illustrating signal waveforms of various portions in the embodiment 3.

FIGS. 8(a)–(o) are timing charts showing signal waveforms of various portions of the single-chip microcomputer 400 which carries out the A/D conversion in the sleep mode, and starts its operation from the sleep mode only if the compared result of the A/D conversion result with the reference value CMPDATA satisfies a predetermined condition.

It is assumed here that the single-chip microcomputer 400 operates in the normal operation mode, and hence the operation mode switching signal SLEEP applied to the operation mode switching signal input terminal 1a is placed at the "L" level. Accordingly, the clock switching signal MODE is placed at the "L" level, and hence the system clock switching $\phi$ is selected as the A/D conversion clock signal ADCLK to be supplied to the A/D conversion clock signal input terminal 2a.

When the CPU outputs the sleep mode setting signal at time t0 as illustrated in FIG. 8(b), the operation mode switching signal SLEEP changes its level from the "L" to "H" level. In response to this, the system clock signal $\phi$, which has been output while the operation mode switching signal SLEEP is at the "L" level, is set at the "H" level at the time t0 as illustrated in FIG. 8(a).

When the operation mode switching signal SLEEP changes its level from the "L" to "H" level at time t0, the clock switching signal MODE also changes from the "L" to "H" level, thereby switching the A/D conversion clock signal ADCLK, which is to be supplied to the A/D conversion clock signal input terminal 2a, from the system clock signal $\phi$ to the alternative clock signal $\phi$CR. In this case, since the trigger signal ADSTARTTRG has not yet been produced from the two-input OR gate 5, the alternative clock signal $\phi$CR is set at the "L" level, and hence the A/D conversion clock signal ADCLK is halted.

Subsequently, when the external trigger signal EXTTRG is input at time t1 as illustrated in FIG. 8(e) to start the A/D conversion, the trigger signal ADSTARTTRG is produced at the same time t1 in response to the external trigger signal EXTTRG, and is supplied to the oscillation start signal input terminal 1b of the peripheral circuit oscillator 1 and the A/D conversion start signal input terminal 2b of the A/D converter 2.

In this case, since the operation mode switching signal SLEEP is set at the "H" level, the peripheral circuit oscillator 1 starts its oscillation, outputting the alternative clock signal $\phi$CR from the clock signal $\phi$CR output terminal 1d. The alternative clock signal $\phi$CR is supplied to the A/D conversion clock signal input terminal 2a of the A/D converter 2 through the two-input AND gate 3b and two-input OR gate 3d. Thus, the A/D converter 2 starts the A/D conversion in response to the alternative clock signal $\phi$CR and the trigger signal ADSTARTTRG.

Afterward, at time t2 when the predetermined clock cycles (16 cycles, here) have elapsed, the A/D converter 2 completes the A/D conversion with outputting the A/D conversion stop signal ADCOMP.

Completing the A/D conversion, the A/D converter 2 outputs the 8-bit A/D conversion result signal ADRESLT from the A/D conversion result output terminal 2c. In response to this, the comparator 16 compares it with the reference value CMPDATA prestored in the comparison register 15, and outputs the compared result signal CMP only when they satisfy the predetermined condition. In response to the compared result signal CMP, the operation mode switching signal SLEEP output from the latch 19 changes its level from the "H" to "L" level, thereby releasing the sleep mode at time t3.

Although the oscillator starts oscillating the system clock signal $\phi$ when the sleep mode is released at time t3, its oscillation is unstable immediately after the start. Accordingly, the system clock signal $\phi$ is not supplied to the CPU or A/D converter 2 by time t4 at which the oscillation has been stabilized as illustrated in FIGS. 8(a) and 8(k). In other words, an appropriate waiting time is required for the system clock signal $\phi$ to be supplied to the CPU and A/D converter 2.

At time t2 when the A/D converter 2 completes the A/D conversion, and supplies the A/D conversion stop signal ADCOMP to the oscillation stop signal input terminal 1c of the peripheral circuit oscillator 1, the peripheral circuit oscillator 1 halts its oscillation. The A/D conversion stop signal ADCOMP can also cause an interrupt to the CPU.

The present embodiment 3 is also applicable to the foregoing embodiment 2 of the single-chip microcomputer operating in the high-rate mode and low-rate mode, by reading the "sleep mode" in the present embodiment 3 as the "low-rate mode".

According to the present embodiment 3, the A/D conversion can be achieved even in the sleep mode in response to the externally supplied trigger signal EXTTRG. In addition, it has an advantage that the operation mode of the single-chip microcomputer 400, that is, whether the sleep mode is to be released or not, can be determined after the A/D conversion by comparing the A/D conversion result signal ADRESLT with the preset reference value CMPDATA.

Embodiment 4

Next, an example will be described of a microcomputer which incorporates as a peripheral circuit an I²C bus (a trade mark of a bidirectional bus of Philips' in the Netherlands). The microcomputer is started from the sleep mode by having the I²C bus carry out a series of operations associated with address data reception in response to a clock signal generated by a multivibrator in a stop mode in which the I²C bus is in a slave receiving mode, and by having a system clock signal generated in response to a result of the address data reception.

Figure 9:
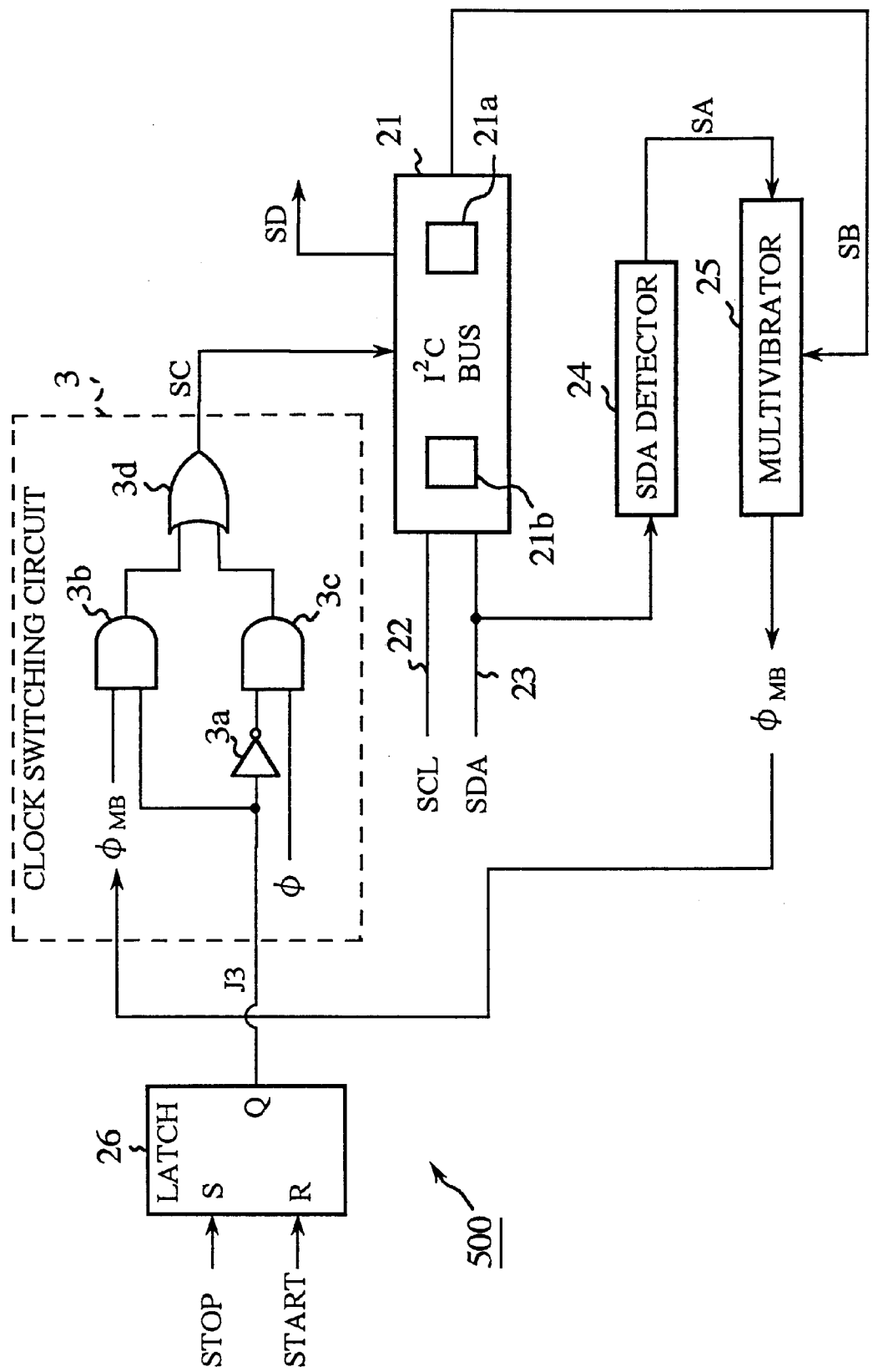
FIG. 9 is a block diagram showing a main part of an embodiment 4 of the data processor in accordance with the present invention.

FIG. 9 is a block diagram showing a main portion of an embodiment 4 of the data processor in accordance with the present invention, in which the configuration of the clock switching circuit 3 is the same as that of the foregoing embodiments 1–3, and hence the description thereof is omitted here.

In FIG. 9, the reference numeral 500 designates a single-chip microcomputer (data processor); 21 designates an I²C bus (bidirectional bus) as a peripheral circuit; 21a designates an alternative clock generation controller block; 21b designates an interrupt signal generating circuit for generating an interrupt signal for releasing the sleep mode in response to address data received from a serial clock line (bidirectional transmission line) 22 which will be referred to as "SCL" from now on; 23 designates a bidirectional serial data line which will be called "SDA" below; and 24 designates an SDA detector (alternative clock generation controller) for producing a multivibrator start signal in the stop mode in which the I²C bus is in a slave receiving mode. The SDA detector 24 and alternative clock generation controller block 21a constitute the alternative clock generation controller.

The reference numeral 25 designates a multivibrator (alternative clock generator) and 26 designates a latch. The latch 26 inputs through its set input terminal a one-shot φ (system clock) stop signal output when the single-chip microcomputer 500 shifts to the sleep mode, and through its reset input terminal a one-shot φ (system clock) start signal when the single-chip microcomputer 500 shifts from the sleep mode to the normal operation mode, in which it operates in response to the system clock signal φ. The latch 26 outputs from its Q output terminal a clock switching signal J3 which is placed at the "H" level when the φ stop signal is input to the set input terminal, and changes to the "L" level when the φ start signal is input to the reset input terminal.

Next, the operation of the present embodiment 4 will be described.

FIGS. 10(a)–(i) are timing charts showing the operation when starting the single-chip microcomputer 500 from the sleep mode by having the I²C bus 21 carry out the series of operations associated with the address data reception in response to the clock signal generated by the multivibrator 25 in the stop mode, in which the I²C bus 21 is in the slave receiving mode, and by having the system clock generated in response to a result of the address data reception.

At time t0 when the single-chip microcomputer 500 shifts to the sleep mode and the system clock signal φ is halted, the φ stop signal is supplied to the set input terminal of the latch 26 at the start of the sleep mode. As a result, the clock switching signal J3 rises to the "H" level at time t0 as illustrate in FIG. 10(a).

Figure 10:
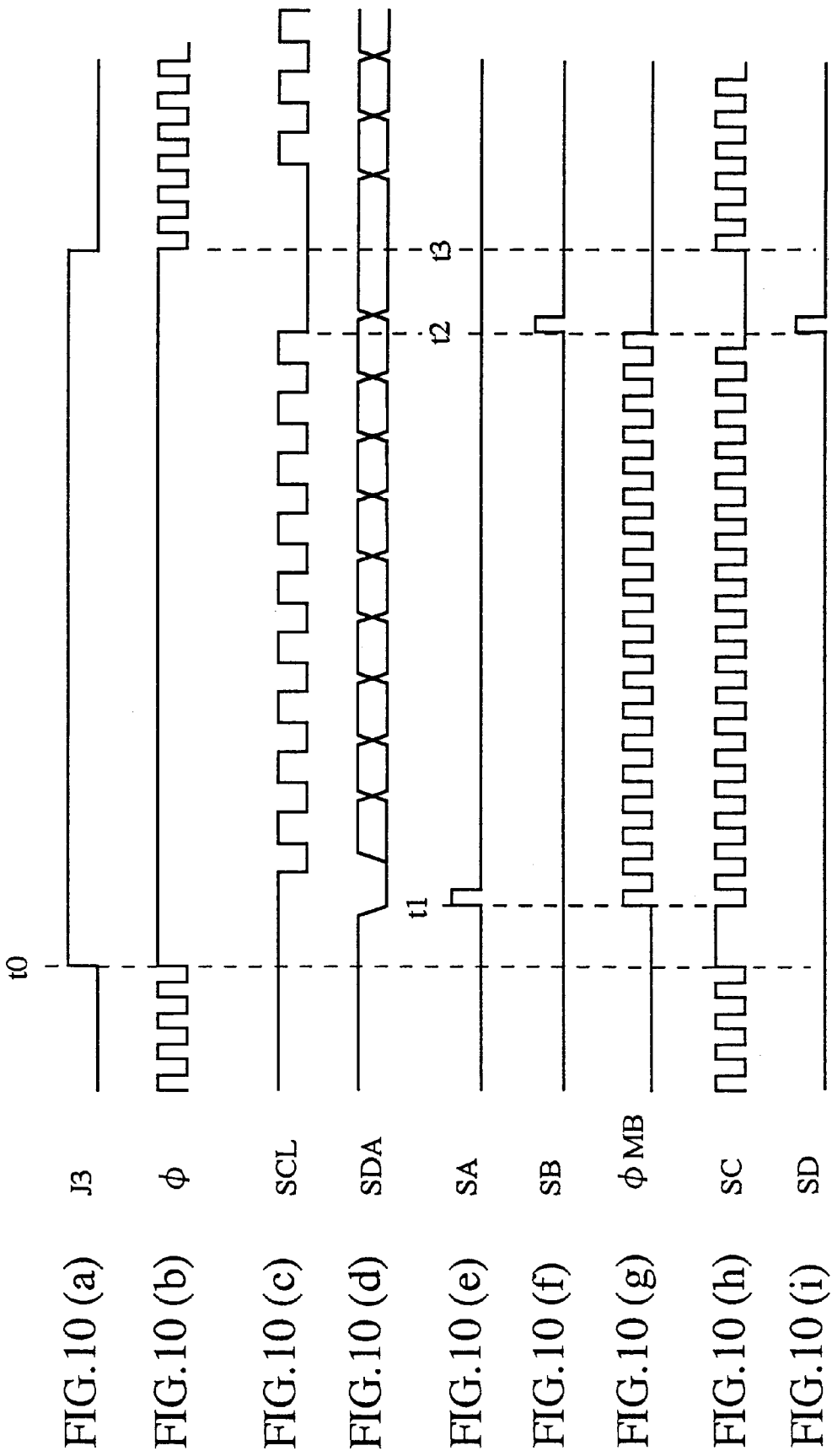
FIGS. 10(a)–(i) are timing charts for illustrating signal waveforms of various portions in the embodiment 4.
Figure 11:
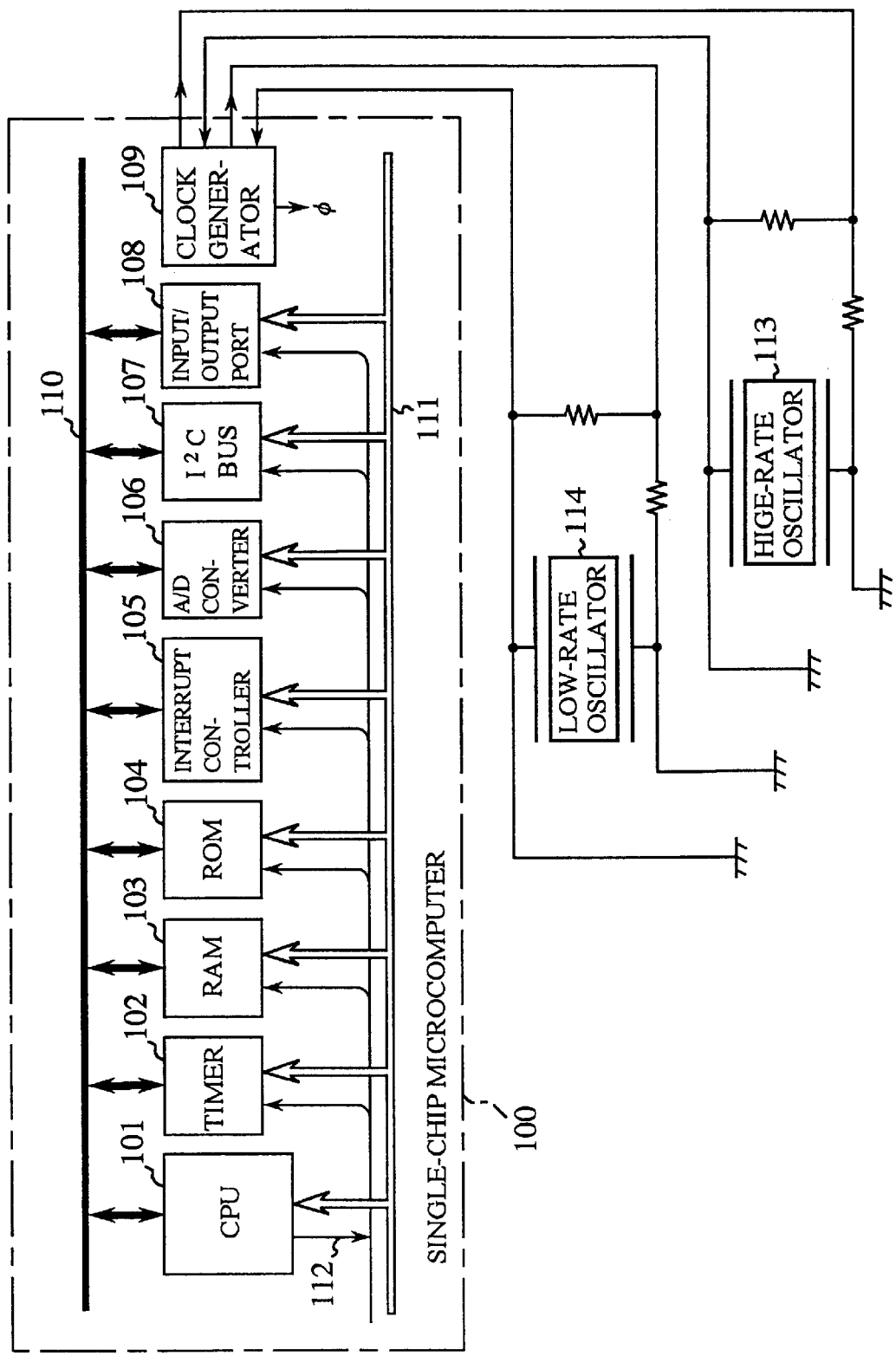
FIG. 11 is a block diagram showing a configuration of a conventional data processor.

In the sleep mode of the single-chip microcomputer 500, in which the system clock signal φ is suspended, although the I²C bus 21 halts its operation, the SDA detector 24 detects the falling edge (start condition) of the SDA at time t1 as illustrated in FIGS. 10(d) and 10(e). When the SDA detector 24 detects the start condition as illustrated in FIG. 10(d), it supplies the multivibrator 25 with a multivibrator start signal SA. Then, the multivibrator 25 starts its oscillation at time t1, thereby generating the alternative clock signal φMB as illustrated in FIG. 10(g).

The alternative clock signal φMB is supplied to the I²C bus 21 through the two-input AND gate 3b and two-input OR gate 3d because the two-input AND gate 3b opens and two-input AND gate 3c closes owing to the clock switching signal J3 of the "H" level.

As a result, the I²C bus 21 starts its operation even when the single-chip microcomputer 500 is in the sleep mode, carrying out the series of operations associated with the address data reception such as generation of acknowledge bits. Then, having generated the final clock pulse (acknowledge clock pulse) of the address data, the I²C bus 21 supplies the multivibrator 25 with a multivibrator stop signal SB at time t2 as illustrated in FIG. 10(f), thereby halting the oscillation of the multivibrator 25. At this time t2, the SCL is placed at the "L" level as illustrated in FIG. 10(c), thereby holding the I²C bus 21.

At the same time t2, the I²C bus 21 generates the interrupt signal SD as illustrated in FIG. 10(i), which activates the oscillator to generate the system clock signal φ of the single-chip microcomputer 500, and releases the sleep mode. When the oscillator starts to generate the system clock signal φ at time t2, and its oscillation is stabilized at time t3 after an oscillation stabilized period has passed, the φ start signal is input to the reset input terminal of the latch 26 so that the clock switching signal J3 output from the Q output terminal of the latch 26 changes from the "H" to "L" level as illustrated in FIG. 10(a).

As a result, the two-input AND gate 3b of the clock switching circuit 3 closes, and two-input AND gate 3c opens so that the system clock signal φ is supplied to the I²C bus 21 through the two-input AND gate 3c and two-input OR gate 3d. Thus, the I²C bus 21 begins the normal operation mode based on the system clock signal φ.

According to the present embodiment 4, the SDA detector 24 can detects the falling edge of the SDA even in the stop mode, in which the I²C bus 21 is in the slave receiving mode, and the I²C bus 21 can carry out the series of operations associated with the address data reception in response to the alternative clock signal φMB generated by the multivibrator 25 instead of the halted system clock signal φ. This offers an advantage of saving power by an amount reduced by the single-chip microcomputer 500 which remains in the sleep mode while the I²C bus 21 carries out the series of operations associated with the address data reception.

What is claimed is:

1. A data processor that has a normal operation mode in which it operates in a normal rate, and a power saving mode in which it saves consumed power, and that operates in response to a system clock signal generated by a system clock oscillator in the normal operation mode, said data processor comprising:

a peripheral circuit;

an alternative clock generator for generating an alternative clock signal used instead of said system clock signal;

a clock switching circuit for supplying said peripheral circuit with the alternative clock signal generated by said alternative clock generator in said power saving mode, and with the system clock signal generated by said system clock oscillator in said normal operation mode; and an alternative clock generation controller for controlling generation of the alternative clock signal by said alternative clock generator in said power saving mode, wherein said power saving mode is a sleep mode in which generation of said system clock signal is halted and wherein said alternative clock generation controller comprises a feedback loop controlling circuit which starts generation of the alternative clock signal by said alternative clock generator in the sleep mode by enabling a feedback loop of said alternative clock generator in response to a trigger signal indicative of a start of a processing of said peripheral circuit, and which halts the generation of the alternative clock signal by disabling the feedback loop of said alternative clock generator when one of releasing of said sleep mode and completion of the operation of the peripheral circuit by the peripheral circuit has occurred.

2. The data processor as claimed in claim 1, wherein said peripheral circuit is an A/D converter.

3. The data processor as claimed in claim 1, wherein said clock switching circuit comprises a gate circuit for supplying, in said sleep mode, said A/D converter with the alternative clock generated, under control of said alternative clock generation controller, by said alternative clock generator in response to a clock switching signal based on an operation mode switching signal, and for supplying, when said sleep mode is released, said A/D converter with the system clock by switching from said alternative clock signal in response to said clock switching signal.

4. The data processor as claimed in claim 3, further comprising:
  a register for storing in advance a reference value to be compared with an output of said A/D converter;
  a comparator for comparing the output of said A/D converter with said reference value stored in said register; and
  a control circuit for releasing the sleep mode of said data processor in response to a compared result by said comparator, and for controlling supply of the system clock to said A/D converter in response to the compared result by said comparator, said supply of the system clock being carried out through said clock switching circuit when the sleep mode is released.

5. The data processor as claimed in claim 3, wherein said feedback loop control circuit of said alternative clock generation controller comprises:
  a first holding circuit for latching said trigger to signal indicative of the start of the processing of said A/D converter, and a completion signal output when the A/D conversion of said A/D converter has been completed;
  an input circuit for capturing, in response to an output of said first holding circuit latching said trigger signal, a status signal indicative of the power saving mode;
  a second holding circuit for latching said status signal fed through said input circuit in a phase opposite to a phase captured by said input circuit, and for outputting it as a control signal for controlling clock switching operation of said clock switching circuit; and
  an oscillation control circuit for controlling enabling and disabling of said feedback loop of said alternative clock generator in response to the status signal captured by said input circuit and to an output of said second holding circuit.

6. The data processor as claimed in claim 1, wherein said power saving mode is a sleep mode in which generation of said system clock signal is halted, and wherein
  said peripheral circuit is a bidirectional bus system for transferring data through a bidirectional transmission line;
  said alternative clock generation controller comprises a detector for having said alternative clock generator start generation of said alternative clock signal in response to a change in a potential level of said bidirectional transmission line, and for having said alternative clock generator halt generation of said alternative clock signal in response to address data said bidirectional bus system receives from said bidirectional transmission line while operating in response to said alternative clock signal;
  said clock switching circuit comprises a gate circuit for supplying, in said sleep mode, said bidirectional bus system with said alternative clock signal generated by said alternative clock generator, and for supplying, when said sleep mode is released, said bidirectional bus system with said system clock signal by switching from said alternative clock signal; and
  said data processor further comprises an interrupt signal generating circuit for generating an interrupt signal for releasing said sleep mode in response to the address data said bidirectional bus system receives from said bidirectional transmission line while operating in response to said alternative clock signal.

7. A data processor that has a normal operation mode in which it operates in a normal rate, and a power saving mode in which it saves consumed power, and that operates in response to a system clock signal generated by a system clock oscillator in the normal operation mode, said data processor comprising:
  a peripheral circuit;
  an alternative clock generator for generating an alternative clock signal used instead of said system clock signal;
  a clock switching circuit for supplying said peripheral circuit with the alternative clock signal generated by said alternative clock generator in said power saving mode, and with the system clock signal generated by said system clock oscillator in said normal operation mode; and
  an alternative clock generation controller for controlling generation of the alternative clock signal by said alternative clock generator in said power saving mode;
  wherein said data processor has a high-rate mode in which it operates at a high rate and a low-rate mode in which it operates at a low rate, and said power saving mode is the low-rate mode,
  wherein said alternative clock generation controller comprises a feedback loop controlling circuit which starts generation of the alternative clock signal by said alternative clock generator in the low-rate mode by enabling a feedback loop of said alternative clock generator in response to a trigger signal indicative of a start of a processing of said A/D converter, and which halts the generation of the alternative clock signal by disabling the feedback loop of said alternative clock generator when one of releasing of said low-rate mode to shift into said high-rate mode and completion of A/D conversion by said A/D converter has occurred; and
  wherein said clock switching circuit comprises a gate circuit for supplying, in said low-rate mode, said A/D converter with the alternative clock generated, under control of said alternative clock generation controller, by said alternative clock generator in response to a clock switching signal based on an operation mode switching signal, and for supplying, when said low-rate mode is released to shift into said high-rate mode, said A/D converter with the same clock by switching from said alternative clock signal in response to said clock switching signal.

8. The data processor as claimed in claim 7, wherein said feedback loop control circuit of said alternative clock generation controller comprises:
  a first holding circuit for latching said trigger signal indicative of the start of the processing of said A/D converter, and a completion signal output when the A/D conversion of said A/D converter has been completed;
  an input circuit for capturing, in response to an output of said first holding circuit latching said trigger signal, a status signal indicative of the power saving mode;
  a second holding circuit for latching said status signal fed through said input circuit in a phase opposite to a phase captured by said input circuit, and for outputting it as a control signal for controlling clock switching operation of said clock switching circuit; and
  an oscillation control circuit for controlling enabling and disabling of said feedback loop of said alternative clock generator in response to the status signal captured by said input circuit and to an output of said second holding circuit.

* * * * *